United States Patent [19]

Howell

[11] 3,811,108

[45] May 14, 1974

[54] REVERSE CYCLIC CODE ERROR CORRECTION

[75] Inventor: Thomas Harold Howell, Scottsdale, Ariz.

[73] Assignee: Honeywell Information Systems Inc., Waltham, Mass.

[22] Filed: May 29, 1973

[21] Appl. No.: 364,782

[52] U.S. Cl. .......................................... 340/146.1 AL

[51] Int. Cl. .............................................. H04l 1/10

[58] Field of Search ............................ 340/146.1 AL

[56] References Cited

OTHER PUBLICATIONS

Dahler, P. R., Automatic Correction of Burst Errors in Variable Length Serial by Bit Messages, in IBM Tech. Disc. Bull. 6(10): pp. 24–28, March 1964.

*Primary Examiner*—Malcolm A. Morrison

*Assistant Examiner*—R. Stephen Dildine, Jr.

*Attorney, Agent, or Firm*—James A. Pershon

[57] ABSTRACT

A method and apparatus is disclosed in which reversible cyclic encoding is used to enable reverse error identification. Encoding and decoding is performed in essentially a conventional manner, except that the coding conforms to a reversible cyclic generator polynomial. In the preferred embodiment, a linear feedback shift register is augmented with logic gates which enables the reversing of syndrome bits for subsequent error identification cycling in the event an error is detected.

3 Claims, 12 Drawing Figures

REVERSE CYCLIC CODE ERROR CORRECTION

BACKGROUND OF THE INVENTION

This invention relates generally to error correcting codes and more specifically to a method and apparatus for economical autonomous error correction of cyclic coded data having variable length codewords.

1. Field of the Invention

There is a growing need for communication channels of extreme reliability for use with computers and automation equipment. In the communication between peripherals and a central data processing system via a communication channel, many chances occur for the introduction of noise to the desired signal. To overcome some of the extraneous signals the source information is encoded prior to transmission over the communications channel for eventual decoding at the receiving system. It is essential that the binary signal obtained by the receiving system match the symbol that was generated by the source system. It is a purpose of error correction codes to detect and correct any errors generated in the encoding and decoding of these signals.

2. Description of the Prior Art

A frequent complication with the implementation of error correcting cyclic binary codes is the processing of high-ordered zeros due to the difference between the natural codeword length and the actual data block length of the system. Select cyclic codes such as Fire codes, correct a single burst error in a code vector by burst-error correction.

For example, a Fire code with a generator polynomial, $P(x) = (x^{28} = x^3 + 1)\ (x^{52} + 1)$, with a single burst-error correction length of 26 bits, has a natural codeword length $n$ = 13,958,643,660 bits. For a data field of 2304 bits, 13,958,641,276 high-order zeros must be accounted for in the correction process. In a system having bit-serial, fixed length codewords, it is common to use hardware pruning techniques which can be applied at relatively low cost. For variable length data field applications, methods for decreasing hardward logic for each possible data field length becomes complex and costly.

Reference is made to the book, *Error Correcting Codes*, by W. Wesley Peterson, the MIT Press, copyrighted 1961 by Massachusetts Institute of Technology, especially chapter 10, pages 183–200 for a discussion of Fire codes and other error correction techniques.

In a bit-serial fixed length data field, application of a technique for decreasing the number of logic elements such as shown on page 194 of the aforementioned book, can be applied at a relatively low cost. For variable length data field applications, hardware shortening logic for each possible data field length would become unwieldy and far too costly. For the byte-serial applications, transformation of bit-serial logic to byte-serial usually results in a very complex system of feedbacks and feedforwards when hardware shortening is included.

SUMMARY OF THE INVENTION

It has been discovered that reversible cyclic codes provide a mechanism which enables the efficient correction of error; independent of the actual natural code length of a codeword being processed. A reversible code is one in which for each and every valid codeword thereof, its counterpart reverse codeword is also valid, wherein a reverse codeword is merely the same codeword with the order of the bits reversed. With the simplest implementation, a linear feedback shift register is provided which will generate the check bits for a reversible cyclic code in a conventional manner. Such a linear feedback shift register is an encoder which can encode and decode cyclic codewords in a conventional manner. The basic encoder/decoder structure is augmented by gating which enables the reversing of the syndrome as stored in the encoder/decoder after the decode process is completed and before the error correction process is started. During the error detection process, the codeword is also stored in a push-down buffer register, so that immediately upon the completion of an error detection process, the last bit received is available to apply to the error encoder/decoder for an error correction process. During the error correction process, the reversed syndrome is cycled until the reversed error pattern is detected.

The use of the reversible cyclic error-correcting codes permits a correction procedure from the least significant end of the message. This new reference point is fixed for shortened and variable length data fields. This eliminates the need for shortening the message by the use of hardware logic which results in significant savings. The lessening in the number of hardware logic elements results in higher speeds by reverse correction. Although the spectrum of possible codes is narrowed by selecting only reversible codes, a sufficient number of reversible codes exist to satisfy the practical applications.

Accordingly, it is an object of the invention to provide a method and apparatus for providing a cyclic error detection encoder/decoder which is effectively independent of a shortened codeword length.

It is a further object of the invention to provide error correction of cyclic codes which is simple and is autonomous in the sense that no provision need be made for external error correction calculations or the transfer of information concerning actual shortened codeword length.

These and other objects of the present invention will become apparent to those skilled in the art as the description proceeds.

BRIEF DESCRIPTION OF THE DRAWING

The various novel features of this invention, along with the foregoing and other objects, as well as the invention itself, both as to its organization and method of operation, may be more fully understood from the following description of an illustrated embodiment when read in conjunction with the accompany drawing, wherein.

DESCRIPTION OF A PREFERRED EMBODIMENT

For the purposes of the following discussion, the following terms are defined:

$n$ = natural length of codewords,
$k$ = natural information field length,
$n'$ = actual length of codewords,
$k'$ = actual information field length,
$n-k = n'-k'$ = number of check bits,
$d$ = displacement from the start of the codeword to the error pattern,
$h = n - d - B$, where $h$ is the displacement from the least significant end of the $n'$-bit field to the error pattern,
B = maximum correctable burst-error length,
*msb* = most significant bit of the codeword,
*lsb* = least significant bit of codeword.

Figure 1A:
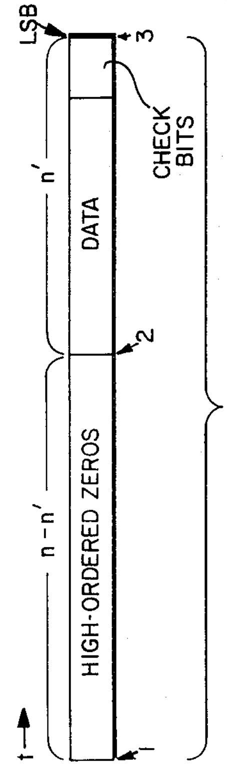
FIGS. 1A and 1B illustrate the format of shortened cyclic codes.
Figure 1B:
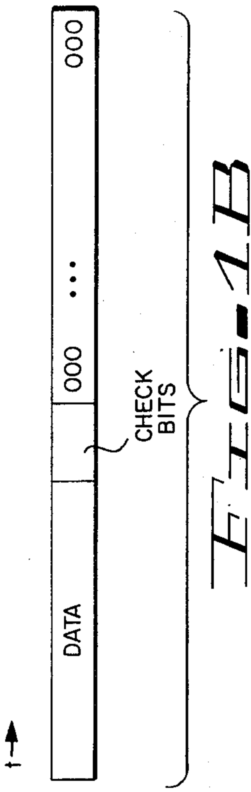

As illustrated in FIG. 1A, a shortened codeword having an actual length of $n'$ can be considered as being extended with $n-n'$ high order zeros. When transmitted serially, the codeword begins at point 2 and terminates with the 1st bit at point 3. From an encoding standpoint, the actual transmission beginning at point 2 is equivalent to transmission with the $n-n'$ leading zero bits between points 1 and 2. When a linear feedback shift register is used for decoding a serial cyclic encoded word, feedforward connections can be made so that the codewords are transformed into the form shown in FIG. 1B. In the conventional manner, the number of steps required in order to identify an error, i.e., determine the location of the error pattern, is directly related to the displacement of the bits in error (from the *msb*). Thus, for $n-n'$ large, correction can be very wasteful in the case of the natural codeword of FIG. 1A but reasonably economical in the case of FIG. 1B. However, the hardware for the shortened codeword of FIG. 1B is only suitable for a single shortened codeword length. It is evident that in general it is not normally practical to provide a set of feedforward hardware connections so as to support all possible shortened codeword lengths and that when a fixed number of shortened codewords is accommodated the use of a different codeword length requires fundamental changes in the hardware.

Figure 2B:
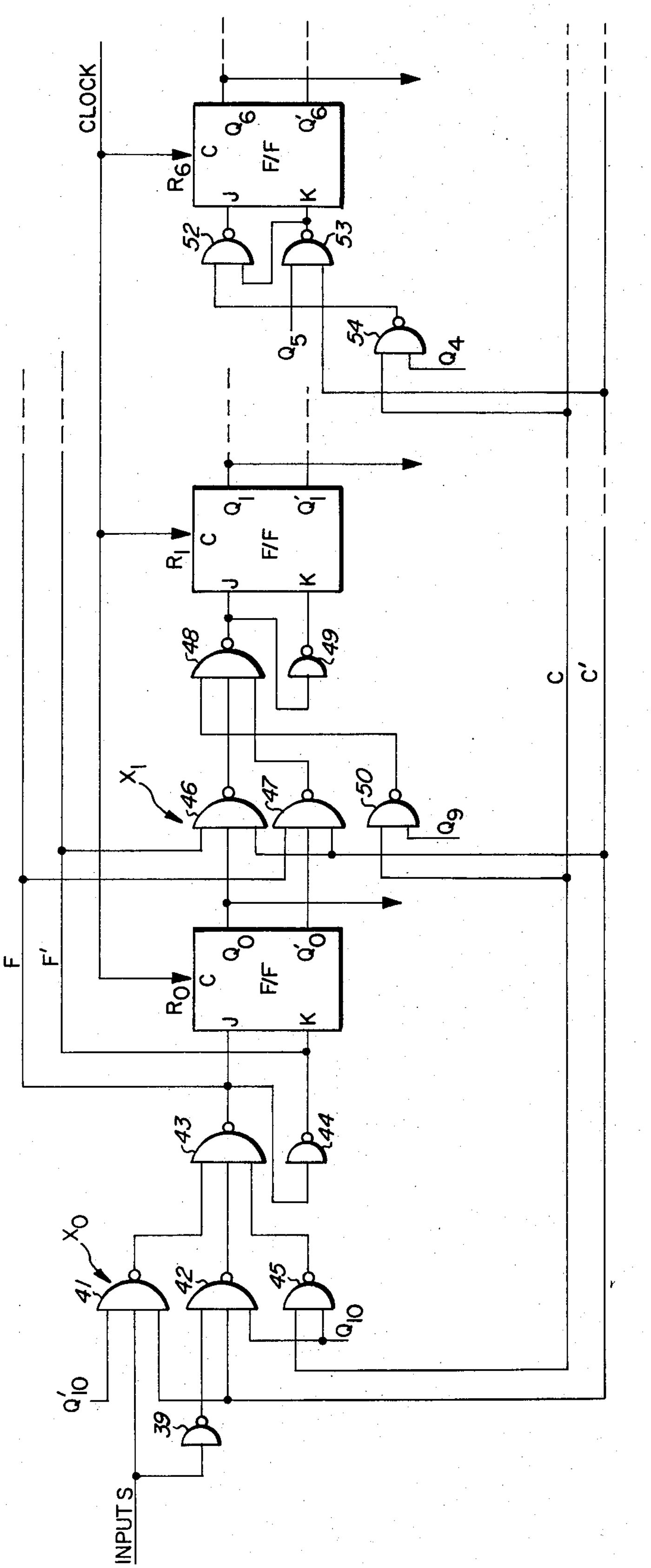
FIG. 2B is a logic diagram of a portion of the implementation of the block diagram as shown in FIG. 2A.
Figure 2A:
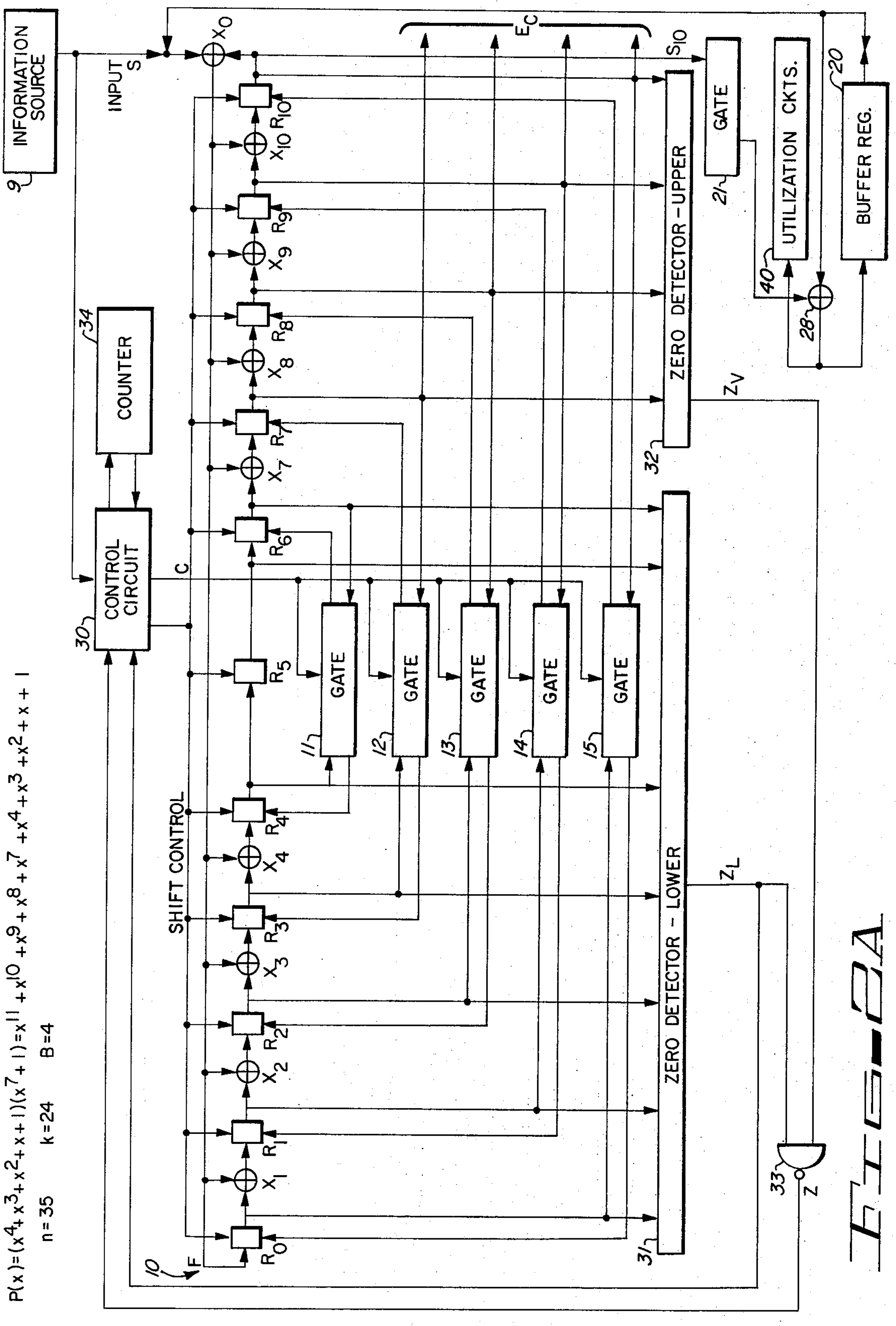
FIG. 2A is a block diagram of a linear feedback shift register system incorporating the present invention.

In the preferred embodiment of the invention, FIG. 2A, a feedback shift register is provided in which there are eleven shift register stages $R_{0-10}$ for implementing the (34, 24) Fire code. For those stages which have feedback connections, there are corresponding mod 2 gates $X_{0-10}$. For an encoding operation, a string of input information bits from source 9 is applied to input mod 2 gate $X_0$ which also receives an input from the output of stage $R_{10}$. In the usual manner, the output of mode 2 gate $X_0$ is also applied to mod 2 gates $X_{1-4}$ and $X_{7-10}$. The output of stages $R_{0-3}$ and $R_{6-9}$ provide the second input to mod gates $X_{1-4}$ and $X_{7-10}$, respectively. The outputs of stages $R_4$ and $R_5$ are applied directly to the inputs of respective stages $R_5$ and $R_6$. In parallel, the input bit string S is applied to the control circuit 30 and the utilization circuits via Exclusive-OR-gate 28. After the input bit string S has been applied to the linear feedback shift register 10, the contents of register 10 are then read out as the check bits.

For decoding, a bidirectional, last-in-first-out shift register 20 is provided for storing the received $n'$-bit word. A counter 34, connected to the control circuit, serves to control the error location operation. Gates 11–15 serve to reverse the syndrome in the linear feedback shift register. Gate 11 is connected between stages $R_4$ and $R_6$; gate 12 is connected between stages $R_3$ and $R_7$; gate 13 is connected between stages $R_2$ and $R_8$; etc.

In FIG. 2A, the control circuit 30 provides the shift control for the development of the check bits and the transmission of the check bits after the $k$ information bits are transmitted. For an error detection operation, the feedback shift register 10 operates in much the same manner as for error encoding. An $n'$-bit word (which may or may not be codeword) is then received from information source 9, which synchronizes the shift control pulses from control circuit 30, and the bit string is applied to the feedback shift register 10. After $n'$ bit pulses, control circuit 30 terminates the shift cycles. Upper zero detector 32 and lower zero detector 31 are provided to sense an all-zeros condition for the feedback shift register 10. When a valid codeword has been decoded, the outputs $Z_L$ and $Z_Y$ of the zero detectors will have a logical value of 1, and these signals, NANDed by gate 33, will produce a Z signal having a logical value of 0 for the all-zeros condition. Accordingly, if an invalid word is decoded, Z will have a value of logical 1, and a control signal C is generated by control circuit 30 which will then start a correction operation. The correction operation is initialized by enabling gates 11–15, whereby the syndrome bits in the feedback shift register 10 are reversed. For example, the bits in flip-flops $R_0$ and $R_{10}$ are interchanged. Control circuit 30 then causes the feedback shift register 10 to recirculate the syndrome until the zero detector 31 output $Z_L$ indicates that an all-zeros condition holds for the shift register stages $R_{0-6}$. This result indicates that an error identification condition exists. With this condition, the stages $R_{7-10}$ then contain a pattern representing the error bits. In order to enable error correction, the word is stored in a bi-directional buffer shift register 20 when the codeword is decoded originally. During the error identification operation, the received word is recirculated, in the reverse direction. When the error identification condition is detected, gate 21 is enabled and the error correction pattern is then also applied to mod 2 gate 28.

FIG. 2B is a logic diagram of a preferred implementation of the feedback shift register 10 of FIG. 2A. NAND-gates 41–43 essentially constitute a mod 2 gate $X_0$, forming the Exclusive-OR sum of each input bit of word S and the most significant bit $Q_{10}$ of feedback shift register 10. For the implementation of error identification initialization, NAND-gate 45 combines $Q_{10}$, the output of shift register stage $R_{10}$, with the initialization control signal C. The output of NAND-gate 45, together with the partial product terms of $X_0$ from NAND-gates 41 and 42 are applied to gate 43, which sets the J input of feedback shift register flip flop stage $R_0$. The same signal, inverted by NAND-gate 44 is applied to the K input of stage $R_0$. These same logic signals, respectively, also provide the linear feedback signals F and F'. The logic for the second stage is basically the same as that for the first stage. The outputs $Q_0$ and $Q'_0$ of the stage $R_0$ are applied respectively to NAND-gates 46 and 47. These gates also receive the feedback signals F and F′, together with the error identification control signal C′. The outputs of NAND-gates 46 and 47, together with output $Q_9$, NANDed by C with gate 50, are applied to NAND-gate 48 which is connected to the J input of feedback shift register stage $R_1$. The J input is inverted by NAND-gate 49 and applied to the K input of stage $R_1$. For stages such as stage $R_6$, where there is no feedback connection, the logic is simplified. When clocked, this stage $R_6$ is set from stage $R_5$ by NAND-gate 53 or from stage $R_4$ through NAND-gate 54, via NAND-gate 52. In the case of a linear feedback shift register with an odd number of stages, such as occurs in FIG. 2A, the middle stage is connected in the same way as stage $R_6$, except that the $Q_4$ and $Q_5$ inputs are interchanged.

Figure 3A:
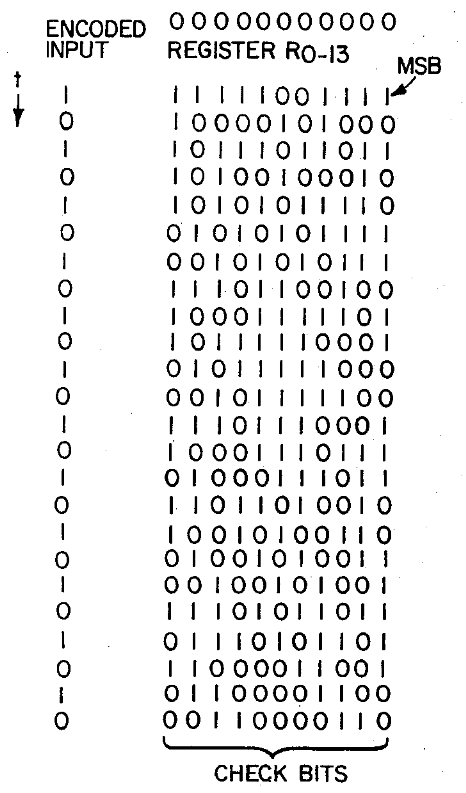
FIGS. 3A–3E illustrate the operation of the system using the reversible cyclic codes as applied to the system shown in FIG. 2A.
Figure 3C:
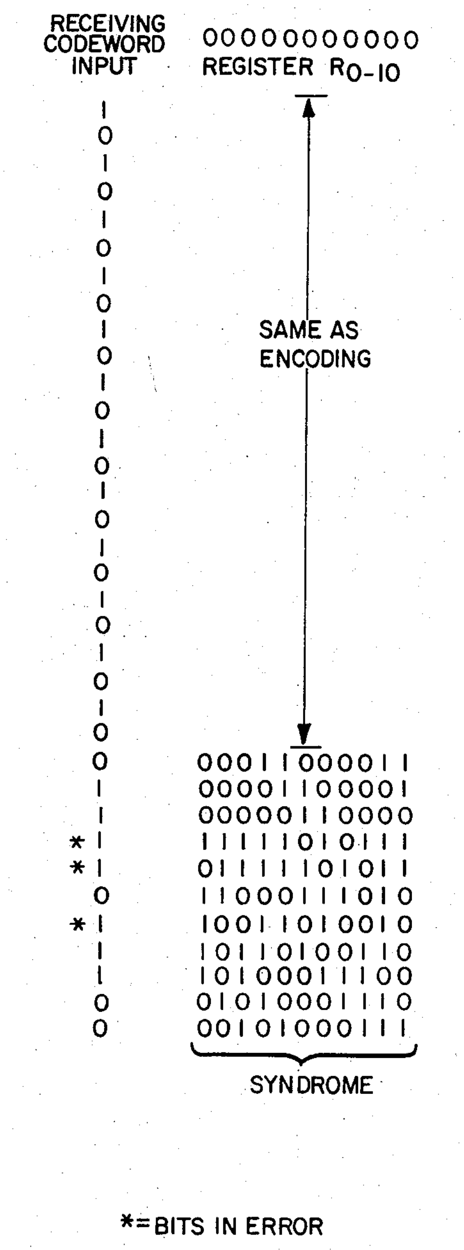
Figure 3B:
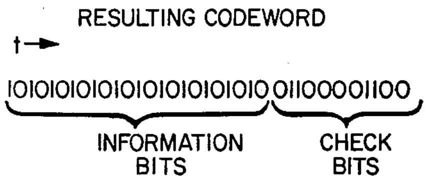
Figure 3D:
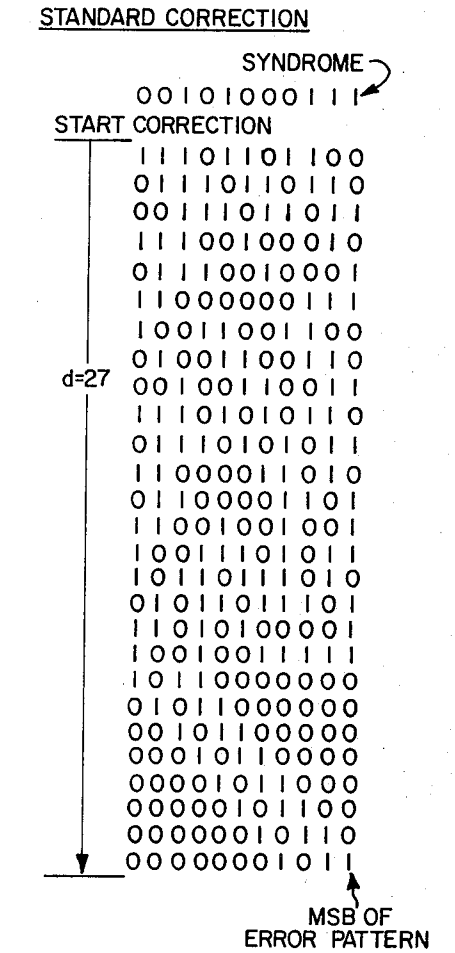

FIG. 3A illustrates the encoding operation for a representative string of information bits from source 9. The initial state of linear feedback shift register 10 (of FIG. 2A) is all zeros, that is, all the flip-flops $R_{0-10}$ are in a reset state. The representative set of information bits can be represented with octal digits as 52525252. As these bits are applied serially to mod 2 gate $X_0$, the feedback shift register cycles through $k = 24$ bits cycles. The successive states of the respective register stages $R_{0-10}$ are shown progressively in time from top to bottom. The last line of FIG. 3A shows the state of feedback shift register 10 after all the $k = 24$ information bits have been processed. Gate 21 is then enabled and the contents of the feedback shift register are shifted out and form the trailing check bits of the encoded codeword as shown in FIG. 3B. The decoding or error detection operation is similar to the encoding operation. As seen in FIG. 3C, the linear feedback shift register 10 is initially in an all zeros condition for flip-flops $R_{0-10}$. The first 24 bits received are error free, and because the sequence of bits is identical with the bits when they were recorded, the states of the flip-flops $R_{0-10}$ will progress in exactly the same way as shown in FIG. 3A. After the first 24 bits, the 11 trailing bits are processed in the same manner. However, as indicated with asterisks, three of the bits are erroneous. Therefore, after the word has been completely processed, the final state of the feedback shift register, indicated in the last line of FIG. 3C, is the syndrome which is non-zero in accordance with the error condition. FIG. 3D illustrates the operation of the linear feedback shift register in a conventional correction operation. Starting with the syndrome in an unreversed condition, the feedback shift register is cycled through 27 steps until the first six bits are all zeros. At this point, the last four bits of the shift register, $R_{7-10}$, can be used directly to correct the word.

Figure 3E:
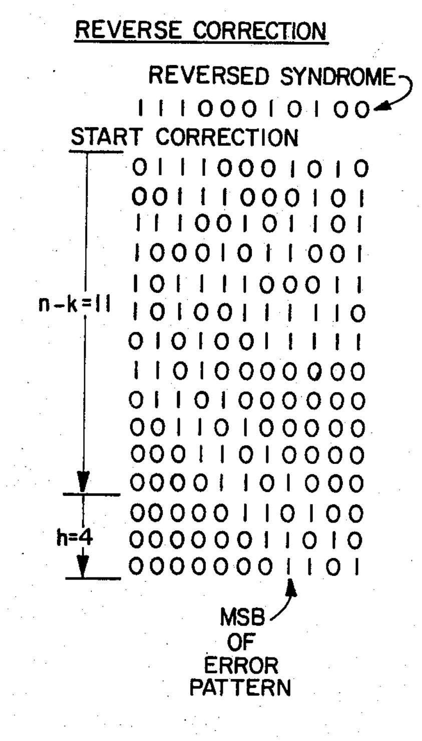

The FIG. 3E diagram illustrates a correction operation which begins with the syndrome reversed. That is, the contents of the linear feedback shift register 10 are reversed. The first and last bits are interchanged, the second and next to last bits, are interchanged, etc. As before, the feedback shift register cycles until the first seven bits of the feedback shift register are all zeros. The error pattern is again present in the last four bits of the feedback shift register, but the order of the bits is reversed, relative to the result in FIG. 3D. It should be noted that the number of cycles required was 15 which is the number of check bits plus the complement of the trailing position in the code word.

The primary characteristics of the FIG. 2A encoder/decoder is that the error correction polynomial implemented by the linear feedback shift register is a reversible code and that for the error identification operation, the syndrome is reversed. Perhaps the most meaningful characteristic of a reversible code is that for each valid codeword therein, the reverse of the codeword is also a valid codeword. Another significant characteristic of a reversible cyclic code is that its generator polynominal, when expanded, is symmetrical. That is, for a polynomial of degree $m$ and having a term of degree i, then there is a term of degree $m-i$. For example, considering the (35, 24) Fire code implemented in FIG. 2A, the term $x^9$ has the symmetrical counterpart term $x^2$. A sufficient and necessary definition of reversible cyclic code, as used herein, is that for its generator polynomial, each factor thereof shall have its reciprocal as another factor in the polynomial. A reciprocal polynomial $f^*(x)$ of a polynomial $f(x)$ of degree $m$ is $$f^*(x) - x^m f(1/x).$$

Figure 4:
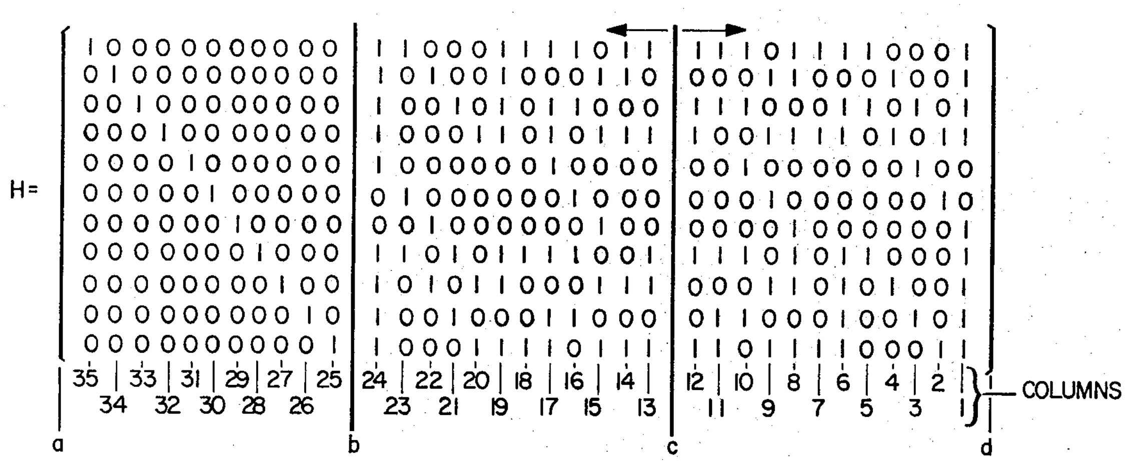
FIG. 4 is a diagram showing the cyclic code H-matrix.

In the (35, 24) Fire code, each factor is its own reciprocal. Another example is the (14, 6) code $$P(x) = (x^3+x+l)\ (x^3+x^2+1)\ (x^2+1)$$

in which the first two factors are reciprocals. In considering the operation of reversible codes such as the (35, 24) Fire code, reference can be made to the H-matrix (parity check matrix) such as the one shown in FIG. 4 for the code of FIG. 2A. The columns represent the syndromes of errors in the corresponding bit position. I.e., $S_i$ represents the syndrome for an error in bit position $i$. This code has a single burst-error correction capability of length 4. It can be seen that the columns progressing in opposite directions from point $c$ are the reverse of one another. Column 12 scanned downward is identical to Column 13 read upward; likewise, Columns 11 and 14, 10 and 15, etc., are reversed pairs.

Figure 6:
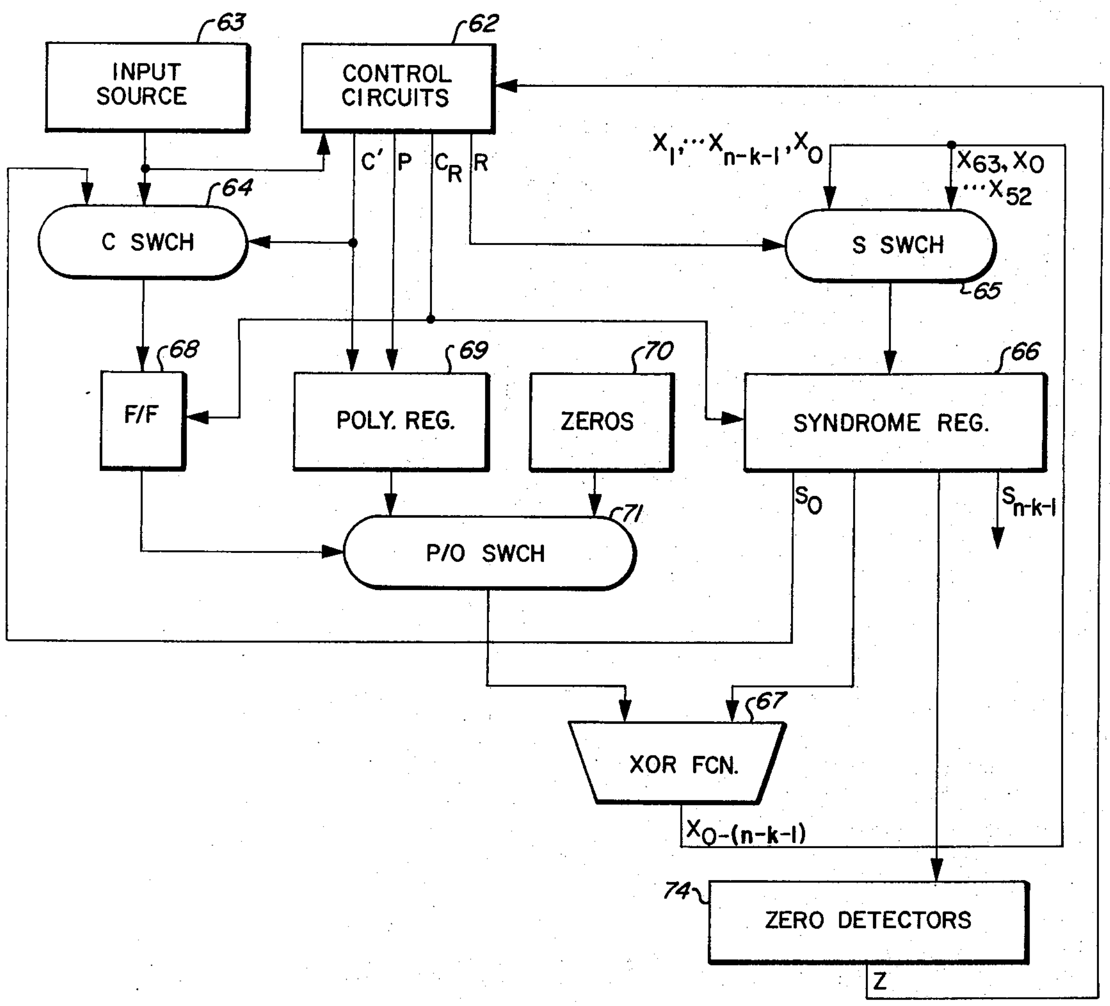
FIG. 6 is a block diagram of an implementation of the invention into a communications channel in which the encoder/decoder operates in a reverse direction for error identification.

In FIG. 6, an alternative apparatus is shown in block diagram form for reverse error correction. During encoding and decoding, bits from input source 63 are applied through switch 64 to a function control flip-flop 68 and are also applied to the control circuits 62 in order to develop synchronized strobe pulses for the encoder/decoder. Function control is obtained by having the function control flip-flop 68 select either the polynomial register 59 input or a hard-wired all-zeros input 70 to P/O switch 71 which is applied to the Exclusive-OR function generator 67. An $n$-$k$-bit syndrome register 66 is initially cleared, and has its output $S_0, \ldots, n\text{-}k\text{-}1$ connected as the second input to Exclusive-OR function generator 67. The polynomial register 69 will contain the coefficients of the $n$-$k$-1 least significant terms. For example, with $P(x) = 1+x+x^2+x^3+x^4+x^7+x^8+x^9+x^{10}+x^{11}$, the polynomial register 69 will contain 11111001111. The output $X_0, \ldots, n\text{-}k\text{-}1$ is applied as two sets of inputs to S switch 65. The bit connections to the S switch are made such that the output bits are rotated one bit either to the left or to the right. These rotated bits are then applied to the syndrome register 66. The control signal R from control circuits 62 causes the S switch 65 to select the right rotation during encoding and decoding. When the zero detectors 74 indicate an error condition after the word has been received, the control signal R is inverted, thereby causing the S switch to apply the left rotation input to the syndrome register 66. At the same time, control signal C′ changes the function control so that the least significant bit $S_0$ from the syndrome register 66 controls flip-flop 68. For encoding, after the input information bits have been processed, the check bits are available from the most significant bit $S_{n-k-1}$ of the syndrome register 66. The encoder/decoder of FIG. 6 has certain advantages in respect to implementation. The switches 64, 65 and 71 can be in the form of 1 of 2 selector integrated circuit packages, sometimes called multiplexers. Similarly, the registers 66 and 69, together with the Exclusive OR function generator 67 can be standard LSI parts.

Figure 5:
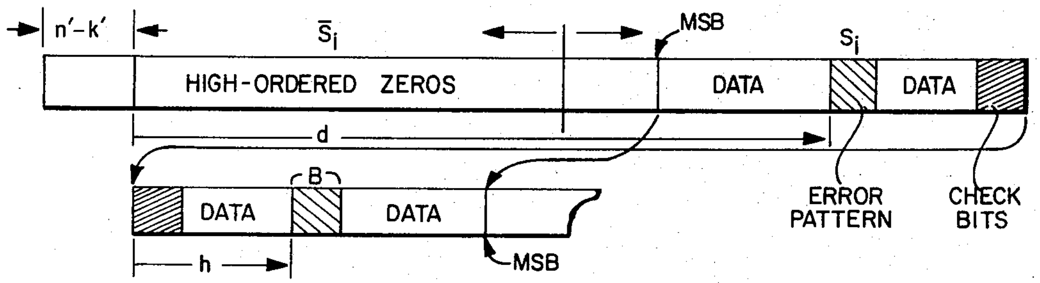
FIG. 5 is a diagram showing the effect of cyclic code reversal.

The essence of the method disclosed herein is the step of reversing the syndrome resulting from a codeword decoding operation when an error is detected. It is evident that the physical reversal of a syndrome is equivalent to reversing the polynomial structure. That is, in the FIG. 2A structure for example, reversing the feedback connections so that stages $R_0$ and $R_{10}$ are effectively interchanged, is equivalent to reversing the syndrome as described. With either approach, the reverse cyclic error correction process is implemented as diagrammed in FIG. 5. Also, for the purposes here, a correction operation is essentially equivalent to an error identification operation.

It is understood that the invention should not be construed as being limited to the form of embodiment described and shown herein as many modifications may be made by those skilled in the art without departing from the scope of the invention.

What is claimed is:

1. A method of identifying errors in a set of information bits comprising:

A. applying said set of information bits to an encoder which generates check bits in accordance with a reversible cycle code and appending the generated check bits to the set of information bits to form a codeword;

B. applying the word to an error detector so as to generate a syndrome in accordance with the reversible cyclic code;

C. reversing the order of the syndrome bits; and

D. cycling the reversed syndrome bits until an error pattern is generated for identifying the error.

2. An encoder/decoder, for generating check bits, for detecting an error syndrome and for developing an error pattern, comprising:

A. a linear feedback shift register including:

i. a set of shift register stages suitable for storing the syndrome bits of a cyclic codeword, ii. a set of logic gates interconnecting said shift register stages for receiving a set of input information bits and for realizing a linear feedback shift register which is capable of decoding a reversible cyclic code;

B. a set of reversing gates, interconnecting said shift register stages so as to enable said linear feedback shift register to selectively reverse the order of the syndrome bits in said register;

C. control circuits, connected to said shift register stages and said reversing gates, to selectively provide a decoding mode in which the information bits are decoded into an error syndrome and, when an error is detected, causing said linear feedback shift register to perform an error identification operation.

3. A reversible cyclic code encoder/decoder for encoding, decoding, and error identification of any shortened codeword, comprising:

A. a set of shift register stages of sufficient length to store the syndrome bits of the encoded information bits;

B. a set of mod 2 summation gates interconnecting said shift register stages so as to implement a feedback shift register realizing the reversible cyclic code encoder;

C. upper and lower zero detector means, connected to said shift register stages in such a manner that a zero syndrome is detected for an error decoding operation and error identification pattern location is detected for an error identification operation;

D. a counter responsive to the linear feedback shift register for counting the cycles during an operation;

E. a set of reversing gates interconnecting said shift register stages so as to enable reversing of the codeword bits in the register;

F. a control circuit, connected to each of said shift register stages for cycle control, connected to said counter for terminating an error identification operation after a maximum number of cycles have been performed, and connected to said error detectors and reversing gates for actuating the syndrome reversal.

* * * * *